Aug. 7, 1928. 1,679,871
A. OLGAY
MACHINE FOR MANUFACTURING BOOK COVERS AND THE LIKE
Filed March 11, 1925 6 Sheets-Sheet 1
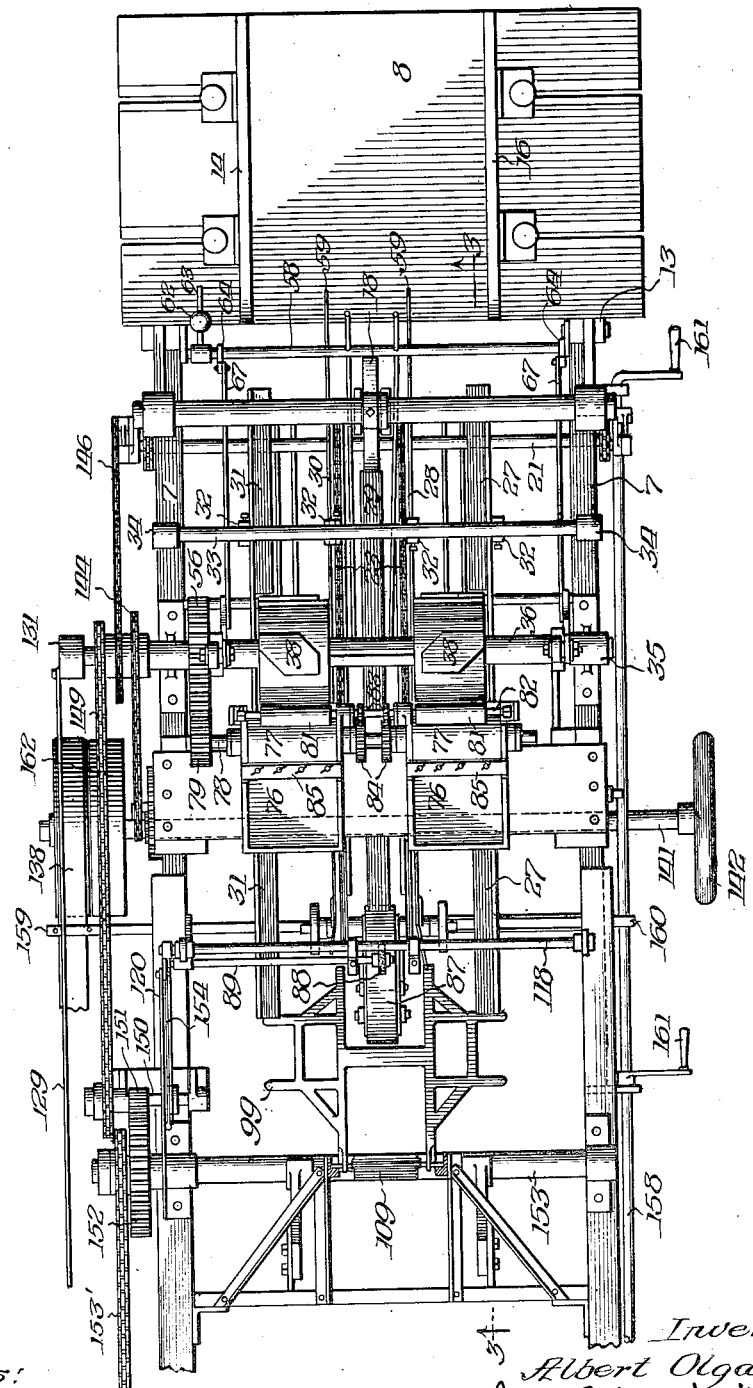

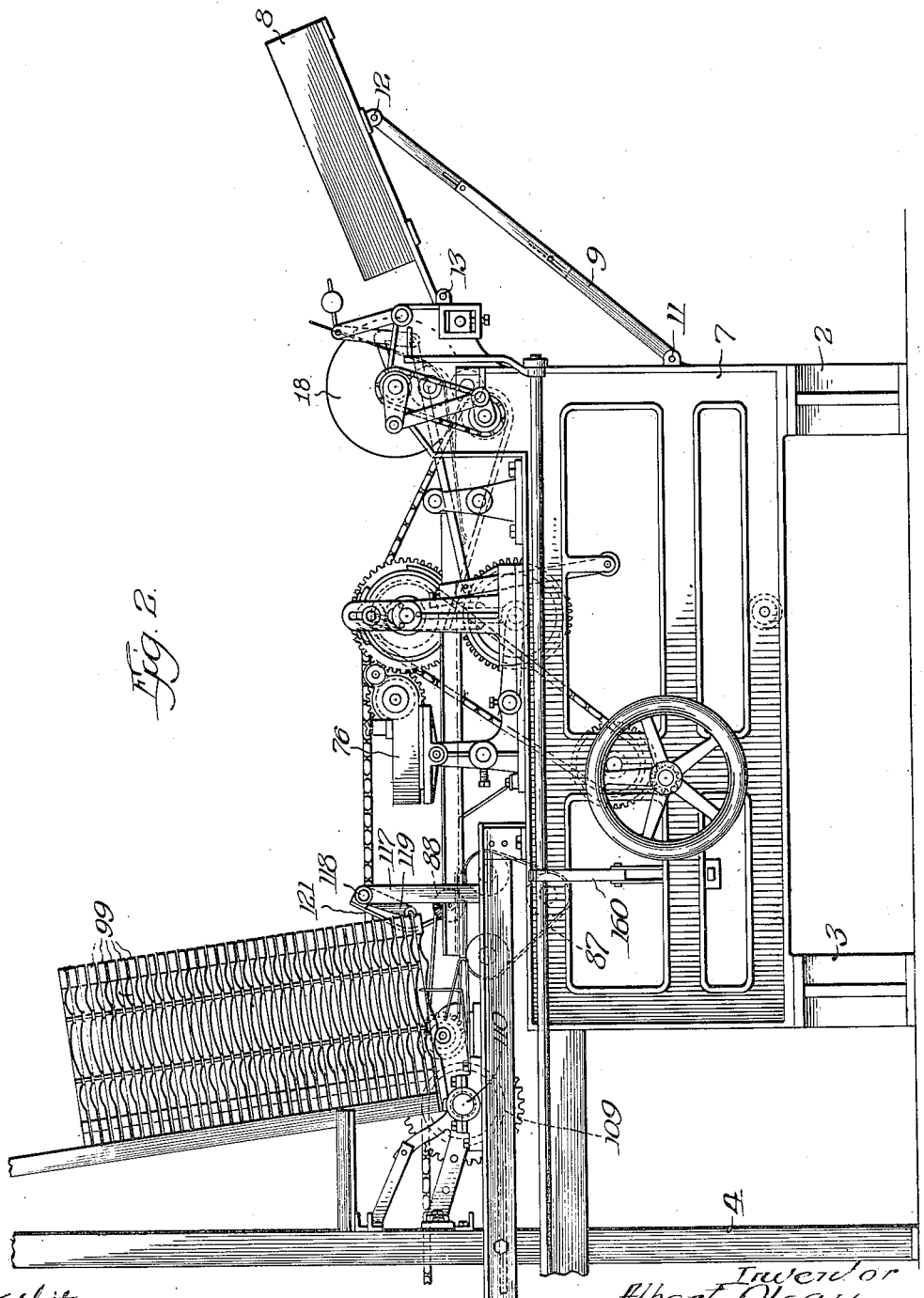

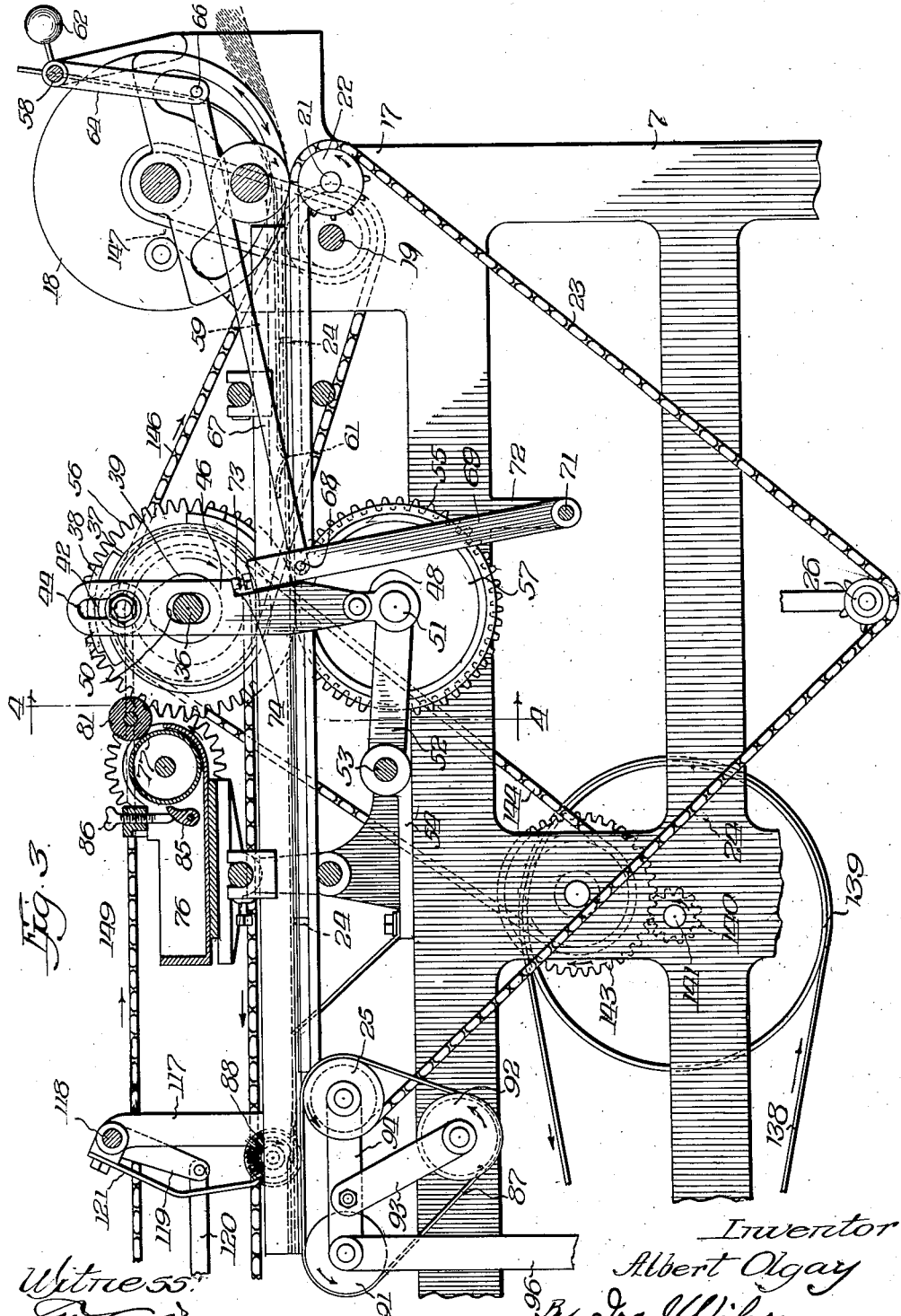

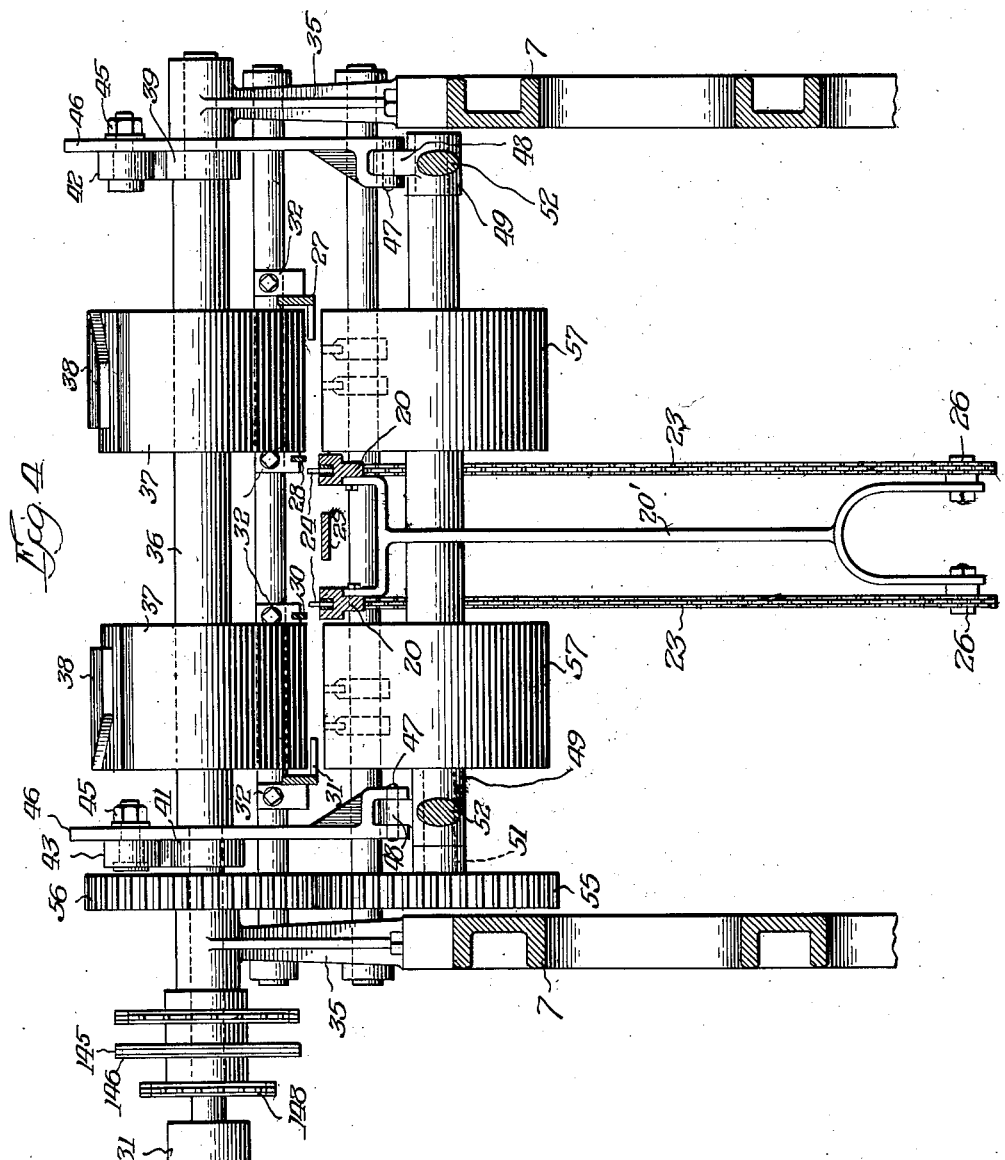

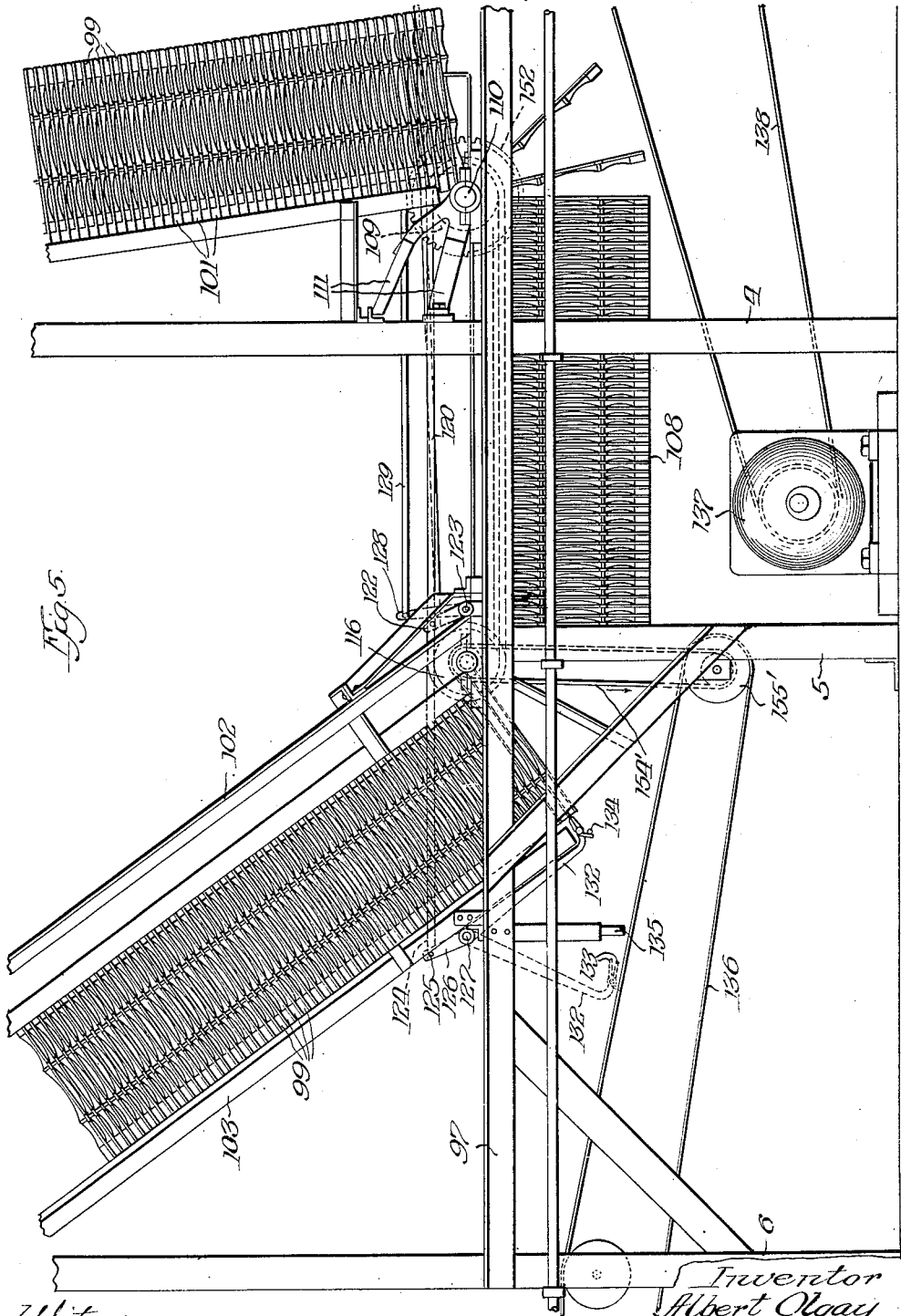

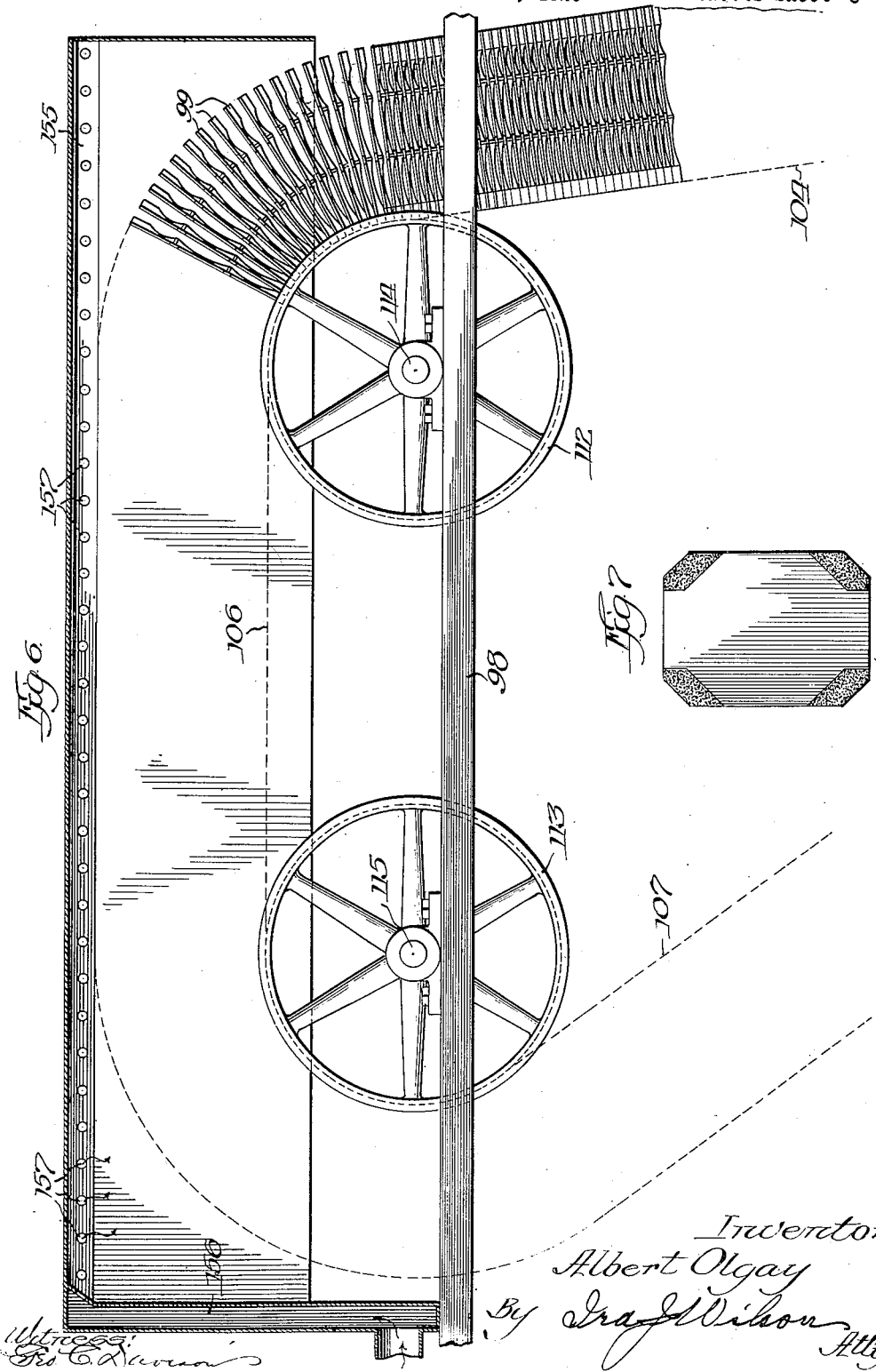

Patented Aug. 7, 1928.

1,679,871

UNITED STATES PATENT OFFICE.

ALBERT OLGAY, OF GLEN ELLYN, ILLINOIS, ASSIGNOR TO GAW-O'HARA ENVELOPE CO., OF CHICAGO, ILLINOIS, A CORPORATION OF ILLINOIS.

MACHINE FOR MANUFACTURING BOOK COVERS AND THE LIKE.

Application filed March 11, 1925. Serial No. 14,658.

This invention relates to machines adapted to gum the edges of paper or other material and is more particularly directed to a machine adapted to apply a gum or glue to the edges of successive sheets of material adapted to be used as book covers and the like, although, in its broader aspects the machine is adaptable for a variety of uses.

Machines have been devised to intermittently apply gum to particular spots or along the edges of sheets of material or to apply gum to continuously fed sheet material, and other machines have been constructed to continuously feed and gum individual articles or sheets and provided with mechanism to intermittently receive the gummed material and convey it by a step by step or intermittent movement to a work station for a subsequent operation to dry the gum, but to my knowledge, no one has ever constructed a machine for the automatic and continuous application of gum or the like to a continuous succession of sheets or articles with a continuously driven gummed article conveyor for continuously drying and discharging the gummed articles at a work receiving station.

Where it has been found necessary to apply gum in any substantial quantity, of thickness or area, it has been found necessary that the gummed material be put through a long drying period. Since it was heretofore possible to apply gum to the material by hand or by machine faster than the gum dried, it was difficult to dispose of the material as it was gummed and during the required drying period. The faster the sheets of material were gummed, the more difficult it became to dispose of the product during the time required for drying. Because it was desirable to have mechanism or room for continuously disposing of the articles to which the wet gum had been applied, this resulted in the improvisation of huge drying wheels (one or more) rotatably mounted upon a shaft and provided with radially projecting and unencompassed spokes or fingers and arranged for slow rotation at a place where the operator could conveniently place the gummed product (usually a sheet of material) between the spokes or fingers. As the wheel rotated slowly, depending upon the time required to dry the gum and the speed of the gumming operation, the size of the wheel necessary to proper and efficient functioning, became prohibitive.

The operator of such machines either gummed the material at the proper places by hand or fed it by hand, one sheet or piece at a time, beneath a gumming die or stamp and thereafter placed the product within the spokes of the drying wheel from which the dried product was removed by another operator. These old machines and processes involved an enormous loss of time, occupied a great deal of space, and, at the same time, required constant service of two or more persons. Efficiency was unknown.

To overcome the foregoing and other serious disadvantages inherent in the prior art are a few of the objects of my invention. I have devised a machine wherein a continuous stream of articles is automatically fed between rolls which apply the gum as desired, and in which the articles are continuously carried in succession to and positioned between drying leaves or holders mounted upon a continuously driven conveyor, chain or belt, adapted to pass the gummed articles or sheets through a drying chamber or the like. The conveyor is of such dimensions, speed of travel, and arrangement that the gum applied to an article will be thoroughly dried between the time the article is placed therein or thereon and the time it is removed therefrom. The space occupied by the drying apparatus will be a minimum and the idle space of the conveyor between the point of insertion of the article within the fingers or leaves and the point where the articles are removed therefrom, will be also reduced to a minimum.

Automatic mechanism is also provided for individually and successively removing the gummed and dried articles from the conveyor and for laying them successively upon any suitable receiving mechanism such, for instance, as a stacking conveyor.

A very important object is to provide a special mechanism, controlled by a break in the stream flow or succession of articles or sheets fed into the machine, to prevent the gumming mechanism from contacting with another and cooperating portion of the machine and applying gum thereto when articles or sheets are not passing therethrough.

Many other features of novelty and the advantages accruing therefrom which are all specific objects of the invention should be readily appreciated and understood from the description and claims and from the drawing in which:

Fig. 1 is a top plan view of the forward end of one form of my invention showing the gumming mechanism, but omitting the drying mechanism, Fig. 2 is a side elevation of the forward part of my machine illustrated in Fig. 1, showing a portion of the gum drying conveyor mechanism, Fig. 3 is a view similar to Fig. 2 but of only a portion of the mechanism there illustrated drawn to a larger scale, Fig. 4 is a vertical section of the machine taken on the line 4—4 of Fig. 3, Fig. 5 is an elevational view of the lower portion of the conveyor mechanism, Fig. 6 is an elevational view of the upper portion of the conveyor mechanism, the lower ends of this portion of the conveyor being substantially contiguous with the upper ends of the portion of the conveyor shown in Fig. 5, and Fig. 7 is a plan view of a book cover such as that described in the Walraven patent hereinbefore mentioned, showing the dotted corner portions where glue or gum is or has been applied.

The invention in one form has been reduced to practice in a machine for the preparation of book covers, such as those described in Patent #1,325,127, issued to Walraven, December 16, 1919. This machine is illustrated in the drawings and comprises suitable supporting members 2, 3, 4, 5, and 6 of any desired construction. The forward end of the machine, including the feeding and gumming mechanisms, is mounted in and supported upon the supports 2 and 3 and comprises a bed frame 7 suitably braced horizontally, adapted to support an adjustable magazine table 8 by means of a plurality of longitudinally adjustable rods 9 pivoted at 11 and 12, as will be readily understood. The table 8 is also pivoted at 13 and provided with adjustable guideways 14 and 16 to accommodate varying widths of stock or sheet material placed thereon.

The frame 7 is provided with an integral bracket portion 17 adapted to support bearing members for the feed wheel mechanism including feed wheel 18 and its drive mechanism 19, for an understanding of which reference is made to my prior Patent #1,443,430, issued January 30, 1923, and assigned to the assignee of the present application. Also mounted in this portion of the machine is a rotatable shaft 21 carrying a pair of sprockets 22 over which chains 23 pass. These chains 23 are provided with a series of upstanding pins 24 and pass over sprockets 25 and 26 and through suitable guides 20 formed in the frame of the machine to convey sheet material fed from the magazine table 8 by means of the feed wheel 18, to the gumming rolls. The sprockets 26 are supported upon a forked member 20' secured to the guideways 20. Sheets of material carried by the chains 23 are urged along by the projecting pins 24 and are supported, pressed, and guided over their bottom and top surfaces and at their edges by means of longitudinal guideways 27, 28, 29, 30, and 31, of which 27, 28, 30, and 31 are arranged for lateral adjustment, and thereby secured in adjusted relation by means of collars 32, adjustably secured on a horizontal bar 33 suitably fixed to the frame 7 as at 34. The sheets of paper or other material fed into the machine pass over the tops of guides 27, 29, and 31 and beneath the bottoms of guides 28 and 30 and are thereby prevented from curling or buckling in their passage.

Beyond the feeding mechanism, a pair of standards 35, mounted upon the frame 7, provide bearings for a shaft 36 carrying a pair or any suitable number of gumming rolls 37 applied thereto. The gumming rolls 37 are preferably made removable from and adjustable longitudinally of the shaft 36 and are provided with pads 38 of the desired configuration, number and spacing of the spot or spots to be gummed on the sheets of material passed thereunder. Mounted upon and secured to the shaft 36, at either end thereof, are cams 39 and 41 adapted to engage cam follower rolls 42 and 43 which are adjustably secured by means of nuts 45 in slots 44 formed in a pair of vertically movable bars 46, pivotally connected at their lower ends as shown at 47 to lugs 48 formed on sleeves 49 within which a shaft 51 is supported and adapted to rotate. The bars 46 are also provided with longitudinal slots 50 adapted to permit their relative vertical movement with respect to the shaft 36. Pivot arms 52 are formed integral with sleeves 49 and are pivoted at 53 in brackets 54 mounted on opposite sides of the bed frame 7. The shaft 51 has a gear 55 secured to the end thereof meshing with a gear 56 secured on the shaft 36 to be driven thereby, and is also provided with a pair of rubber covered platen rolls 57 cooperative with the gumming rolls 37 to press the paper or other material passing therebetween into contact with the gumming faces 38.

Projecting through or otherwise secured to a rock shaft 58, suitably mounted in bearings formed in the frame 7 or brackets thereon, are a pair of fork like or prong members 59 projecting downwardly and toward the gumming mechanism and adapted to contact with the top surface of the sheet material as it is fed to the gumming rolls at or about the point 61 spaced an appropriate distance in front of them. A counterweight 62, adapted to balance the weight of the prong like members 59 and their associated mechanism, is provided for adjustment along an arm 63 and crank arms 64 are also secured to the rock shaft 58 for movement therewith and are in turn pivoted at 66 to link members 67 pivoted at 68 to arms 69 arranged for oscillating movement about pivots 71 formed in brackets 72 secured to the frame 7. Adjustable abutment screws 73 are secured in the tops of arms 69 and adapted to engage beneath a shoulder formed in bars 46 by niches 74. The fork like members are adapted to ride over the top surfaces of the sheets of material being fed from the magazine 8 to the gumming rolls 37 and thereby supported thereupon during passage of the sheet beneath them, but, in the absence of a sheet, will drop down below the plane of the sheet, rocking shaft 58 in a counterclockwise direction, also crank arm 64 in the same direction, pulling arm links 67 to remove the adjustable abutment screws 73 from behind the shoulders formed in the bars 46 to allow the rolls 57 supported thereby to drop, under their own weight and the weight of their associated mechanism, out of co-operative position with the gumming rolls 37.

The cams 39 are secured to the shaft 36 in such a manner that they will raise the arms 46 and with them their supported rolls 57, once in every revolution of the rolls 37 and at a point some distance ahead of the point of tangency or contact of the pads 38 with the surface of the rolls 57, but will again drop the cam followers 42, with their associated mechanism, including the rolls 57, before such point of tangency or contact is reached if the abutment screws 73 are not engaged behind the shoulders formed in the bars 46. Thus, as long as the machine is operating and no sheet of material is passing beneath the prongs 59 to support them, the abutment screws will be held out of engaging position from the bars 46, although the cams 39 will alternately raise and lower the rolls 57 into and out of cooperative relation with the rolls 37, respectively. As soon, however, as a sheet of material is fed beneath the prongs 59, they are immediately raised, throwing the bars 69 and abutment screws beneath and into engagement with the shoulder in bars 46 to hold the rolls 57 in their uppermost and cooperative position upon their being raised to such position by the cams 39. The mechanism just described prevents contact of the gumming pads 38 with the surfaces of the rolls 57. While, in the construction illustrated, the platens are dropped by gravity, other or different cam mechanism may be supplied for the purpose of positively and alternately moving the platen rolls up and down. For instance a spring resisted lost-motion mechanism may be interposed between a second cam and the bars 46 to compensate for the cam action when arms 69 and abutments 73 are engaged with the recesses in bars 46.

Adjustably mounted upon the brackets 54 are gumming receptacles 76 which are provided with gum feed rolls 77 and arranged on a shaft 78 suitably journaled in the frame of the machine and adapted to be driven by means of a gear 79 meshing with the gear 56 on the gumming rolls. Between the gum feed rolls 77 and the gum applying rolls 37 are idling rolls 81 arranged to receive the gum from feed rolls 77 and apply it to the faces of gumming pads 38. These rolls are preferably carried on a shaft 82 journaled in brackets secured to the gum receptacle 76 driven through gears 83 meshing with gears 84 secured on the shaft 78. The gum feed rolls are provided with wiper bars 85 adjustable by means of thumb screws 86 to limit the amount of gum fed to the idling or applying rolls 81.

The sheet material having progressed through the gum applying rolls is carried along through the co-action of the chains 23 and pins 24 to a point where it is desired to feed it to a conveyor adapted to transport the sheets to another point for a subsequent operation and to dry the gum or other material applied during the time of transportation. At this point, a belt 87 overlaps in travel the travel of the chain 23 to receive the sheets of material therefrom and to provide a resilient support, against which a brush 88 mounted on the end of a shaft 89 which is driven in a clockwise direction viewing Figs. 2 and 3, presses the sheet. The rotating brush 88 and the traveling belt 87 are arranged to feed the paper onward, preferably at a much higher rate of speed than the speed at which it is supplied by the pins 24, for a purpose to be hereinafter described. The belt 87 is carried over pulleys 25, 91 and 92 which are suitably braced by members 93, 94 and 96 to the machine frame.

The conveyor mechanism is shown in Figs. 2, 5, and 6 and is suitably supported in any convenient manner upon the standards 4, 5, and 6, joined by longitudinal members 97 and 98 and comprises a chain of leaves 99 hinged together as at 101 and carried in suitable guideways 102, 103, as will be readily understood. This leafed chain conveyor is not in itself new, except as to the manner in which it is arranged and operated and, for this reason, will not be specifically described. It is sufficient to say that the links are so formed and arranged together that they will clamp sheet material placed between pairs of leaves on any straight course, such as those indicated at 104, 106 and 107, and will open at any point of turning along their hinged edges. In order to economize space, to obtain a gum drying period of sufficient length, and to reduce the number of idle leaves between the point of withdrawal of the gummed sheets and the insertion thereof, the conveyor is preferably arranged with a long rearwardly inclined course 104, a long, horizontal course 106, a long forwardly and downwardly inclined course 107, and a straight horizontal course 108 connecting the long courses 107 and 104 at the bottom. This arrangement is determined by the relative relations of a small positively driven pulley 109 carried in suitable bearings 110 formed in the frame 97 and braced by brackets 111 secured to the standard 4, two large pulleys 112 and 113, suitably journaled at 114 and 115 upon the horizontal supports 98, and a small idling pulley 116 suitably journaled on the frame 97. The two pulleys 109 and 116 are of small diameter to insure a quick and wide opening movement of the leaves 99.

The pulley 109 is so arranged with respect to the feed mechanism comprised by the belt 87 and brush 88, that, as a sheet is fed by their combined action, a leaf 99 will rise beneath the sheet and clamp it between it and the immediately preceding leaf for conveyance. The time interval between the point where the open leaves come adjacent the belt and brush feed mechanism and the point where the leaves close is necessarily short, because the leaves must be in a horizontal plane, or substantially so, when the sheets are fed thereon, and the time interval required for a succeeding conveyor leaf to come into such position is relatively short by comparison, therefore making it almost absolutely necessary that each sheet or article be sped rapidly onto the conveyor leaf.

Frictional resistance to the sheet being fed between the leaves of the conveyor is sometimes encountered and sometimes prevents the sheet from being forced totally within the edges of the leaves. To insure against sticking or jamming of the sheets and to position them completely within the confines of the leaves 99, brackets 117 rising from the frame of the machine are supplied and arranged to support a rock shaft 118 upon which a rock arm 119, carrying a kicker finger 121, is fixedly secured. This kicker finger is operated through mechanism to be hereinafter described in synchronism with the gumming rolls and engages behind the rear edge of each sheet as it is fed by the belt 87 and brush 88 between the leaves to urge the sheet completely therebetween.

A link 120 is pivotally connected with the rock arm 119 and extends to the rear for pivotal connection with a similar rock arm 122 rigidly secured to a shaft 123. Also secured to the rock arm 122 or to a separate rock arm, if desired or necessary, is a link 124 pivotally connected at 125 with a picker lever 126 fulcrumed upon the frame at 127 while an additional rock arm 128 has a drive link 129 pivotally connected to it to be rocked thereby through the medium of an eccentric, or crank 131 mounted upon the end of shaft 36. Thus, for every revolution of the shaft 36, which will gum one sheet of material, the rock shafts 118, 123 and 127 will be oscillated through one cycle of movement, the kicker finger 121 will kick against the rear edge of each sheet fed between the leaves of the conveyor just prior to the clamping of the paper between an upper and a nether leaf and at the same instant that the kicker arm is performing its operation, a picker arm 132 formed as a portion of lever 126 and provided with jaws 133 opened and closed by the counterweight 134 may be removing a sheet from between consecutive leaves at the rear. A fork shaped member 135, the prongs of which are spaced wide enough apart to permit passage of the arm 132, but close enough together to prevent passage of a sheet of material therebetween, is preferably provided to positively remove the sheet from the picker jaws, whereupon the sheet will drop upon a belt conveyor 136 for carriage to a point for any subsequent operation.

The machine is preferably driven by means of an electric motor generally indicated at 137, and a belt 138 transmits the power from the motor to a pulley 139 and gear 140 mounted upon a shaft 141. The shaft 141 is preferably provided with a hand-wheel 142 whereby the mechanism may be operated by hand if desired and the gear 140 meshes with the gear 143 suitably journaled in the frame and provided with a sprocket (not shown) driving a similar sprocket mounted on the shaft 36 through a chain connection 144. The shaft 36 is provided with a sprocket 145 carrying a chain 146 for driving the shaft 21 and thereby the shaft 19. The feed mechanism is driven by means of a chain 147 connected over a sprocket on the shaft 19 and the shaft 21 is connected through the intermediary of suitable gears or chains and sprockets with the shaft 19. The chains 23, of course, drive the pulley 25 and thus the belt 87 and a third sprocket 148, mounted on the shaft 36, drives a chain 149 to drive a stub shaft 150, suitably journaled in the side frame of the machine and carrying a pinion 151 meshing with a gear 152 to drive the shaft 153 carrying the pulley or gear 109 driving the conveyor leaf chain.

The brush shaft 89 is driven by means of a belt 154 running over suitable pulleys secured on the shafts 89 and 150, respectively. The shaft 153 is provided with a sprocket over which chain 153' passes for driving connection with a sprocket attached to pulley 116 and this pulley is provided with chain 154' for driving connection with a pulley 155' driving the conveyor belt 136.

In the manufacture of book covers, such as those illustrated in Fig. 7, the paper or cloth sheets are cut substantially to the shape illustrated in this figure and placed between the guides 14, 16 on the magazine table 8 from which they are fed, one at a time, onto the chains 23 by means of the feed mechanism, described in the aforementioned patent, for conveyance to and between the gumming rolls. So long as a continuous stream of sheets of material is being fed between the gumming and platen rolls, the gumming rolls cooperate to apply the gum and the sheets travel on to the conveyor feed mechanism where the combined operations of the belt 87, brush 88, and kicker arm 121 insert the sheets between the leaves 99 of the conveyor as fast as the leaves swing around the pulley 109 and in synchronism therewith. As soon as a sheet is inserted between a pair of leaves, the bottom leaf clamps the sheet to the immediately preceding leaf carrying the sheets upwardly over pulley 112 through a chamber 155 through which a blast of air, preferably previously warmed, is blown from a conduit 156 through openings 157 from any suitable source, for drying the gum, thence downwardly over pulley 113 to the picker mechanism for removing the sheets.

The machine illustrated is of a high speed type adapted to gum at least 100 sheets of material per minute and is of great length, although one operator may easily run the machine. Because of these facts, it is desirable to provide mechanism at conveniently arranged points for shutting off the machine should a jam or breakage occur. To this end, a rock shaft 158 running the full length of the machine and suitably journaled in bearings attached to the frame members thereof, is connected to a belt shifter 159 through a connection 160 from the rock shaft 158. Shaft 158 is provided with hand levers 161 secured thereto at convenient points for manual actuation. An idling pulley 162 may be loosely mounted upon the shaft 141 as will be obvious.

It is believed that the operation of the machine and its essential parts will be understood from the foregoing without further description, but it should be understood that many modifications and variations may be made in the construction and operation thereof within the spirit of the invention and without departure from the scope of the appended claims.

I claim:

1. In combination, a stationary magazine, automatic means including a continuously moving feed wheel for continuously feeding articles from said magazine in a continuous but separated succession, means for automatically applying a viscous composition upon the successively fed articles, a drier, and automatic means for receiving the articles from said composition applying means in succession and for conveying the articles in spaced relation through said drier.

2. In combination, a gumming roll, a roll cooperative therewith for passing sheet material therebetween, means for automatically supplying a continuous stream of sheets to said rolls, and means between said rolls and said feeding means operative upon a break in said continuous stream to permit gravity to move one of said rolls from the other.

3. In combination, a composition applying roll, a platen cooperative therewith, means for feeding a plurality of sheets of material to said composition applying roll, automatic means for dropping said platen below the line of cooperation with said roll in the absence of a sheet being fed to said roll, and means automatically operative in the presence of a sheet being fed to said roll for returning said platen to cooperative relation with said roll.

4. In combination, a continuously moving conveyor for carrying a succession of spaced sheets of material in edgewise relation, means for applying a substance upon each of said sheets of material in succession, a second conveyor adapted to receive and carry said sheets individually to a remote position from said substance applying means, means for individually and positively moving each of said sheets upon said second conveyor, and means automatically operative to grasp the advance edge of each sheet for removing said sheets from said second conveyor at said remote position.

5. In a machine for applying gum to a succession of sheets of material, means for conveying the gummed sheets from the gum applying means to a point of subsequent operation including, a plurality of pulleys, an endless conveyor arranged over said pulleys and having a plurality of leaves extending in planes transverse to the direction of travel of said conveyor and hinged together adjacent their pulley contacting edges, said pulleys and conveyor being arranged to open said leaves adjacent the point of discharge of said sheet material from said gum applying means and also adjacent a point of disposal of said sheet material, means operative upon one edge of each sheet of said material to urge such sheet between a pair of leaves of said conveyor at the first said point, and means to drive said conveyor.

6. In a machine for applying gum to a succession of sheets of material, means for conveying the gummed sheets from the gum applying means to a point of subsequent operation including, a plurality of pulleys, an endless conveyor arranged over said pulleys and having a plurality of leaves extending in planes transverse to the direction of travel of said conveyor and hinged together adjacent their pulley contacting edges, said pulleys and conveyor being arranged to open said leaves adjacent the point of discharge of said sheet material from said gum applying means and also adjacent a point of disposal of said sheet material, means operative upon one edge of each sheet of said material to urge such sheet between a pair of leaves of said conveyor at the first said point, means to withdraw said sheets from between said leaves at the second said point, and means to drive said conveyor.

7. A conveyor system for drying sheet material including, an endless conveyor having a plurality of leaves hinged together and adapted to open at any point of change of direction of course of travel of the conveyor, and means to support and drive said conveyor and to change its direction of course of travel at a plurality of points, two of said points being points of insertion and removal of sheets, between and from said leaves respectively, and said points of insertion and removal being spaced a relatively short distance apart in the direction of travel of said conveyor from said point of removal of articles to said point of insertion thereof.

8. An endless conveyor having a plurality of leaves hinged together and adapted to open at any point of change of direction of course of travel of said conveyor, means to drive said conveyor, and means to change the direction of course of travel of said conveyor at alternate acute and obtuse angles and whereby a plurality of long courses and one short course of travel of said conveyor are provided.

9. In a machine of the character described including an endless conveyor having a plurality of leaves adapted to receive and hold a sheet of material containing a substance to be dried between pairs thereof, means for supporting said conveyor for travel, means for opening pairs of said leaves at one place to receive a sheet of material and at a place remote therefrom for removal of the sheet, and means for inserting a sheet at the first said place, means operative to grasp an edge of each sheet for removing the same from said conveyor at the second said place, and means for operating said removing means in predetermined timed relation to the travel of said conveyor.

10. In a machine of the character described having means for applying a substance to be dried upon successive sheets of material, an endless conveyor having a plurality of leaves adapted to receive and hold a sheet of said material between pairs of said leaves, means for supporting said conveyor for travel, means for automatically opening pairs of said leaves at a place adjacent said substance applying means and at a place remote therefrom, and means for inserting successive sheets of material between successive pairs of leaves at the first said place, mean for automatically removing said sheets at the last said place by pulling each sheet from said conveyor, and means for operating said removing means in timed relation to the travel of said conveyor.

ALBERT OLGAY.